United States Patent [19]

Chen

[11] 3,962,179

[45] June 8, 1976

[54] NEOPRENE COMPOSITIONS CONTAINING TRIARYLPHOSPHINES

[75] Inventor: Mark Chaoming Chen, Wilmington, Del.

[73] Assignee: E. I. Du Pont de Nemours and Company, Wilmington, Del.

[22] Filed: Dec. 19, 1974

[21] Appl. No.: 534,200

[52] U.S. Cl. .................... 260/45.95 G; 260/42.34; 260/45.7 P; 260/79.5 B; 260/79.5 C; 526/2; 526/17; 526/30; 526/291
[51] Int. Cl.² .................... C08K 5/50; C08L 11/00
[58] Field of Search ............. 260/45.7 P, 45.95 G, 260/92.3

[56] References Cited
UNITED STATES PATENTS

| | | | |
|---|---|---|---|
| 2,382,812 | 8/1945 | Parker | 260/92.3 |
| 3,050,499 | 8/1962 | Gordon et al. | 260/45.7 |
| 3,808,183 | 4/1974 | Branlard et al. | 260/92.3 |
| 3,878,181 | 4/1975 | Mayer-Mader et al. | 260/92.3 |

*Primary Examiner*—Lewis T. Jacobs
*Assistant Examiner*—R. A. White

[57] ABSTRACT

Addition to unvulcanized chloroprene polymer of 0.5–5 parts by weight of certain triarylphosphines per 100 parts of polymer improves the processing safety of unvulcanized stocks of polymer prepared in the absence of elemental sulfur and reduces the compression set of vulcanizates. In chloroprene-sulfur copolymers, the addition of triarylphosphines results in improved flex resistance.

14 Claims, No Drawings

NEOPRENE COMPOSITIONS CONTAINING TRIARYLPHOSPHINES

BACKGROUND OF THE INVENTION

This invention relates to the use of certain aromatic phosphines as additives in chloroprene polymers and copolymers to increase the processing safety of the compounds and to reduce the compression set of the vulcanizates or to improve their flex resistance.

Chloroprene polymers and copolymers, commercially known as neoprenes, find a wide range of commercial applications because of their resistance to oils, solvents, and aging and their good flame resistance and film strength. Because of the commercial importance of neoprenes, still further improvement of their properties is being sought.

SUMMARY OF THE INVENTION

It has now been discovered that the processing safety of compounded chloroprene polymers prepared in the absence of elemental sulfur is improved and the compression set of vulcanized polymers is reduced by incorporating into the unvulcanized polymer about 0.5–5 parts by weight of a triarylphosphine per 100 parts by weight of polymer. In the case of sulfur-modified chloroprene polymer prepared in the presence of elemental sulfur, it is observed that flex resistance of the vulcanizates, particularly after heat-aging, is improved.

The triarylphosphines useful in the process of this invention are those where the aryl groups are phenyl, substituted phenyl, naphthyl, and substituted naphthyl groups. The possible substituents on the phenyl or naphthyl radicals are one or more alkyl groups having a total of up to ten carbon atoms per aromatic ring and one or more alkoxy groups having a total of up to five carbon atoms per aromatic ring.

The triarylphosphine usually is added to the neoprene in the compounding stage, but it also may be added to the polymer latex or even to the polymerizing monomer emulsion.

The term "chloroprene polymer" is not limited to homopolymers of chloroprene but also includes copolymers of chloroprene with sulfur and/or with at least one copolymerizable organic monomer, wherein chloroprene constitutes at least 50 weight percent of the organic monomer make-up of the copolymer.

DETAILED DESCRIPTION OF THE INVENTION

Typical triarylphosphines suitable in the process of the present invention include triphenylphosphine, trinaphthylphosphine, various isomeric tritolylphosphines, tris(dimethylphenyl)phosphines, tris(methylethylphenyl)phosphines, tris(hexylphenyl)phosphines, trinaphthylphosphines, tris(methylnaphthyl)phosphines, tris(methoxyphenyl)phosphines, tris(ethoxyphenyl)phosphines, and tris(methoxynaphthyl)phosphines.

Chloroprene polymers which can be used in the practice of this invention are well known to the art. They can be prepared by polymerizing chloroprene, either alone or with at least one other comonomer, in aqueus emulsion in the presence of sulfur or an organic, sulfur-containing chain transfer agent. Various methods of polymerization of chloroprene are disclosed, for example, in Encyclopedia of Polymer Science and Technology, John Wiley and Sons, Volume 3, pages 711–712 (1965). Specific polymers and methods of their preparation are described, for example, in U.S. Pat. Nos. 2,494,087; 2,567,117; 2,576,009; 3,397,173; 3,655,827; and 3,686,156. The most commonly used chain transfer agents are alkyl mercaptans and dialkyl xanthogen disulfides.

Representative comonomers which can be copolymerized with chloroprene include vinyl aromatic compounds, such as styrene, the vinyltoluenes and vinylnaphthalenes; aliphatic conjugated diolefin compounds such as 1,3-butadiene, isoprene, 2,3-dimethyl-1,3-butadiene and 2,3-dichloro-1,3-butadiene; vinyl ethers, esters, and ketones, such as methyl vinyl ether, vinyl acetate, and methyl vinyl ketone; esters, amides, and nitriles of acrylic and methacrylic acids, such as ethyl acrylate, methyl methacrylate, methacrylamide, and acrylonitrile. Throughout this disclosure the term "per 100 parts of monomer" refers to the weight of chloroprene plus the weight of the organic comonomer, if any.

The improvement of the processing safety of unvulcanized chloroprene polymer formulations is observed in the Mooney scorch test as increased time required for a 10-point rise in viscosity. This improvement as well as lowering of compression set occurs in neoprenes prepared in the absence of elemental sulfur, and especially those modified with alkyl mercaptans or dialkyl xanthogen disulfides. The improved flex resistance occurs only in polymers prepared in the presence of elemental sulfur. Chloroprene polymerized in the presence of elemental sulfur is known to form chloroprene/sulfur copolymers. For maximum improvement of flex resistance it is advisable to cure the copolymer with zinc oxide and magnesium oxide, without adding organic accelerators. While the amount of sulfur used for preparing those chloroprene copolymers usually is about 0.1–1.5 weight percent based on total organic monomers, the proportion of copolymerized sulfur in the resulting product is difficult to determine accurately.

The chloroprene polymers containing the phosphines are compounded and cured in the same way as conventional chloroprene polymers. For a discussion of the compounding of neoprenes, see Murray and Thompson, The Neoprenes, E. I. du Pont de Nemours and Company, 1963, Chapter III. For a discussion of resistance to flex cracking, see page 61 of the same reference. The amount of phosphine is not critical, except that at least 0.5 part per 100 parts of polymer is required for a significant effect, while no additional improvement is observed above about 5 parts per 100 parts of polymer.

This invention is now illustrated by examples of certain representative embodiments thereof, where all parts, proportions, and percentages are by weight unless otherwise indicated.

CHLOROPRENE POLYMERS

The following chloroprene polymers are used in these examples:

Polymer A. A mercaptan-modified chloroprene polymer prepared by polymerizing 100 parts of chloroprene in an aqueous, alkaline emulsion containing 1.3 parts of the sodium salt of a disproportionated wood resin, 0.53 part of solid sodium hydroxide, 0.4 part of the sodium salt of a condensation product of formaldehyde and naphthalenesulfonic acid, and 0.3% of sodium bisulfite based on the weight of the chloroprene. Dodecyl mercaptan is the modifying agent and is used in an amount of about 0.23% based on the weight of the chloroprene. The polymerization catalyst is a solution of 0.3% potassium persulfate and 0.015% of sodium anthraquinone-β-sulfonate. This preparation follows the teachings of Example 6 of U.S. Pat. No. 2,494,087.

Polymer B. A blend of 78 parts by weight sol and 22 parts by weight gel chloroprene polymers, wherein the sol (benzenesoluble) polymer is prepared in aqueous emulsion containing 100 parts by weight chloroprene, 0.006 part of potassium persulfate, 0.0003 part of sodium-2-anthraquinonesulfonate, 0.49 part diethyl xanthogen disulfide (used as the modifying agent), 0.55 part sodium hydroxide, and 3 parts disproportionated rosin, together with 91.5 parts water. The gel (benzene-insoluble) component is a crosslinked chloroprene polymer, which is prepared by polymerization to a conversion of about 95% of an emulsion of 97 parts chloroprene, 3 parts ethylene dimethacrylate, 3 parts disproportionated rosin, 0.67 part sodium hydroxide, 0.4 part diethyl xanthogen disulfide, 0.7 part sodium salt of formaldehyde naphthalenesulfonic acid condensate, together with 108.5 parts water. The preparation of the above sol and gel polymers of chloroprene is described in Example 2 of U.S. Pat. No. 3,655,827. Suitable blending techniques are disclosed in the same patent.

Polymer C. A sulfur-modified chloroprene polymer prepared by polymerizing chloroprene in the presence of 0.6 part of sulfur per 100 parts of monomer followed by the addition of tetraalkylthiuram disulfides and the corresponding disubstituted dithiocarbamates. The preparation substantially follows the teachings of U.S. Pat. No. 3,310,544.

Polymer D. A copolymer of 98 parts of chloroprene and 2 parts of 2,3-dichloro-1,3-butadiene prepared in the presence of 0.4 part of sulfur and about 0.4 part of diethyl xanthogen disulfide, substantially as described in Example 1, Sample C, of U.S. Pat. No. 3,766,121. The catalyst is a solution of 0.205 part of potassium persulfate and 0.005 part of sodium anthraquinone-β-sulfonate in 7.79 parts of water, and the reducing agent is 0.25 part of sodium sulfite per 100 parts of monomers.

Testing

The following testing methods are used:

| | |
|---|---|
| Tensile properties | ASTM D 412-68 |
| Compression set | ASTM D 395-69, Method B (70 hrs. at 100°C.) |
| Mooney scorch | ASTM D 1646-72 at 121°C. using the small rotor |
| Flex resistance | ASTM 813-59 (1970) |

(A 2¼-inch stroke is used on the flexing machine.)
The following abbreviations are used in the Tables:
$M_{200}$ — Modulus at 200% elongation, psi
$T_B$ — Tensile strength at break, psi
$E_b$ — Elongation at break %

EXAMPLE 1

In this example, Polymer A is used. Samples are compounded using the following recipe.

| | Parts |
|---|---|
| Chloroprene Polymer | 100 |
| Stearic Acid | 0.5 |
| N-Phenyl-1-Naphthylamine | 2 |
| Magnesia | 4 |
| Semi-reinforcing Furnace Black | 58 |
| Naphthenic Oil | 10 |
| Zinc Oxide | 5 |
| 2-Mercapto-2-imidazoline (accelerator) | 0.5 |
| Triarylphosphine Derivatives | As Shown In Tables I and II |

Samples are cured at 153°C., for 20 minutes, for the tensile tests and for 25 minutes for determination of compression set.

The results of the tests are shown in Tables I and II.

TABLE I

| Sample | A | B | C | D (Control) |
|---|---|---|---|---|
| Triphenylphosphine, Parts | 0.5 | 1 | 2 | 0 |
| Tensile Properties | | | | |
| $M_{200}$ | 1580 | 1620 | 1730 | 1510 |
| $T_B$ | 3380 | 3470 | 3480 | 3290 |
| $E_B$ | 340 | 330 | 310 | 340 |
| Compression set, % | 50 | 41.3 | 30.2 | 49.6 |
| Mooney Scorch | | | | |
| Minimum | 26 | 26.5 | 27.5 | 28 |
| Minutes to 10-Point Rise | 17 | 17 | 16 | 10.5 |

TABLE II

| Sample | A | B (Control) |
|---|---|---|
| Tri(p-tolyl)phosphine, Parts | 2 | — |
| Tensile Properties | | |
| $M_{100}$ | 410 | 460 |
| $T_B$ | 3000 | 3060 |
| $E_B$ | 340 | 340 |
| Compression Set, % | 25 | 41 |
| Mooney Scorch | | |
| Minimum | 26 | 30 |
| Minutes to 10-Point Rise | 17 | 10.5 |

From the above it can be seen that as little as 0.5 part of triphenylphosphine per 100 parts of polymer improves the processing safety of the stock; 1 and 2 parts of triphenylphosphine or 2 parts of tri(p-tolyl)phosphine not only improve processing safety but significantly decrease compression set.

EXAMPLE 2

Example 1 is repeated except that the amount of accelerator is increased to 1 part, and 1 part of triphenylphosphine is used. The results are shown in Table III.

TABLE III

| Sample | A | B (Control) |
|---|---|---|
| Triphenylphosphine Parts | 1 | 0 |
| Tensile Properties | | |
| $M_{200}$ | 2110 | 2180 |
| $T_B$ | 3120 | 3340 |
| $E_B$ | 260 | 270 |
| Compression set, % | 17.2 | 22 |
| Mooney Scorch | | |
| Minimum | 25 | 26 |
| Minutes to 10-Point Rise | 15 | 10.5 |

The results are similar to those in Example 1.

EXAMPLE 3

In this example, Polymer B is used. The compounding recipe is as follows:

|  | Parts |
|---|---|
| Chloroprene Polymer | 100 |
| Stearic Acid | 0.5 |
| Magnesia | 1 |
| N-Phenyl-1-Naphthylamine | 2 |
| Semi-reinforcing Furnace Black | 58 |
| Naphthenic Oil | 10 |
| Paraffin | 1[a] |
| Zinc Oxide | 5 |
| 2,4-Toluenedicarbamic Acid Diester with 2-Dimethylaminoethanol (Accelerator) | 2.5 |
| Triarylphosphine Derivative | As Shown in Tables IV and V |

[a] Paraffin was absent from the formulations used in the experiments presented in Table V.

Samples are cured 30 minutes at 153°C. and tensile properties are determined. The compression set is determined in samples cured for 35 minutes at 153°C. The results are shown below:

TABLE IV

| Sample | A | B | C (Control) |
|---|---|---|---|
| Triphenylphosphine, Parts | 1 | 2 | 0 |
| Tensile Properties |  |  |  |
| $M_{200}$ | 1750 | 1640 | 1790 |
| $T_B$ | 3850 | 3840 | 3710 |
| $E_B$ | 350 | 360 | 340 |
| Compression Set, % | 32.5 | 30 | 44.5 |
| Mooney Scorch |  |  |  |
| Minimum | 25.5 | 24.5 | 27 |
| Minutes to 10-Point Rise | 19.5 | 18.5 | 15 |

TABLE V

| Sample | A | B | C | D | E | F (Control) |
|---|---|---|---|---|---|---|
| Triphenylphosphine, Parts | 1 | — | — | — | — | — |
| Tri(m-tolyl)phosphine, Parts | — | 1 | — | — | — | — |
| Tri(p-tolyl)phosphine, Parts | — | — | 1 | 2 | — | — |
| Tri(p-methoxyphenyl)phosphine, Parts | — | — | — | — | 1 | — |
| Tensile Properties |  |  |  |  |  |  |
| $M_{100}$ | 510 | 520 | 525 | 540 | 580 | 555 |
| $T_B$ | 3610 | 3490 | 3530 | 3930 | 3850 | 3200 |
| $E_B$ | 340 | 340 | 350 | 350 | 360 | 335 |
| Compression Set, % | 28 | 29 | 30 | 25 | 26 | 36 |
| Mooney Scorch |  |  |  |  |  |  |
| Minimum | 29 | 29 | 27 | 27 | 27 | 30 |
| Minutes to 10-Point Rise | 16 | 17 | 16 | 14 | 15 | 11 |

It can be seen again that the triarylphosphines reduce the compression set of the vulcanizate and increase the processing safety of the stock.

EXAMPLE 4

In this example, Polymer C is used. The compounding recipe is as follows:

|  | Parts |
|---|---|
| Chloroprene Polymer | 100 |
| Stearic Acid | 0.5 |
| Magnesia | 4 |
| Antioxidant (a) | 2 |
| Medium Thermal Carbon Black | 100 |
| Aromatic Oil (b) | 10 |
| Low Molecular Weight Polyethylene (Processing Aid) | 1 |
| Zinc Oxide | 5 |
| Triphenylphosphine | As Shown in Table VI |

(a) mixture of 65% N-phenyl-2-naphthylamine and 35% of N,N'-diphenyl-p-phenylenediamine
(b) "Sundex" 790, Sun Oil Co.

Curing times at 150°C. are as follows:
For the determination of tensile properties — 30 min.
For the determination of flex resistance — 35 min.
The results of the test are shown in Table VI.

TABLE VI

| Sample | A | B | C (Control) |
|---|---|---|---|
| Triphenylphosphine, Parts | 1 | 2 | 0 |
| Tensile Properties |  |  |  |
| $M_{200}$ | 825 | 770 | 990 |
| $T_B$ | 1820 | 1870 | 2000 |
| $E_B$ | 430 | 430 | 390 |
| Flex Resistance |  |  |  |
| Original (unaged) Thousands of flexes to 0.5-inch growth | 0.22(a) | 0.21(a) | 594 |
| Sample aged 3 days at 121°C. Thousands of flexes to 0.5-inch growth | 16 | 180 | 9 |

(a) growth of crack (inches) at 594,000 flexes

This example shows that the addition of triphenylphosphine increases the flex resistance of the polymer, both before and after aging.

EXAMPLE 5

In this example, Polymer D is used. The compound recipe is the same as in Example 4 except that the following accelerator composition is included.

|  | Parts |
|---|---|
| Diphenylguanidine | 0.25 |
| Tetraethylthiuram Disulfide | 1.25 |

Curing times and temperatures are the same as in Example 4. The results of the testing are shown in Table VII.

TABLE VII

| Sample | A | B | C (Control) |
|---|---|---|---|
| Triphenylphosphine, Parts | 1 | 2 | 0 |
| Tensile Properties |  |  |  |
| $M_{200}$ | 690 | 615 | 750 |
| $T_B$ | 2080 | 2100 | 2090 |

TABLE VII-continued

| Sample | A | B | C (Control) |
|---|---|---|---|
| $E_B$ | 490 | 520 | 490 |
| Flex Resistance Original, Unaged Crack Growth After 1.8 × 10⁶ flexes, inches | 0.18 | 0.11 | 0.23 |
| Sample aged 3 days at 121°C. Thousands of flexes to 0.5-inch crack growth | 280 | 576 | 24 |

The improved flex resistance is then also observed with a sulfur-modified chloroprene/2,3-dichloro-1,3-butadiene copolymer.

I claim:

1. A vulcanizable chloroprene polymer composition comprising about 0.5–5 parts by weight per 100 parts by weight of said polymer of a triarylphosphine, wherein the aryl groups are selected from phenyl, naphthyl, substituted phenyl, and substituted naphthyl; the substituents being one or more alkyl groups having up to a total of ten carbon atoms per aromatic ring or one or more alkoxy groups having a total of up to five carbon atoms per aromatic ring; and the chloroprene polymer being selected from homopolymers of chloroprene and copolymers of chloroprene with at least one other monomer belonging to the group consisting of sulfur and organic monomers copolymerizable with chloroprene, wherein chloroprene constitutes at least 50 weight percent of the total organic monomer makeup; said composition also comprising magnesia, zinc oxide, and a vulcanization accelerator, except that the vulcanization accelerator may be absent when the chloroprene polymer is a chloroprene/sulfur copolymer.

2. A composition of claim 1 wherein the triarylphosphine is triphenylphosphine.

3. A composition of claim 1 wherein the triarylphosphine is a tritolylphosphine.

4. A composition of claim 1 wherein the chloroprene polymer is a copolymer of chloroprene with at least one other copolymerizable organic comonomer.

5. A compositon of claim 4 wherein the comonomer is 1,3-butadiene, isoprene, 2,3-dimethyl-1,3-butadiene, 2,3-dichloro-1,3-butadiene, acrylonitrile, styrene, or an alkyl acrylate.

6. A composition of claim 1 wherein the chloroprene polymer is a copolymer of chloroprene with sulfur, the amount of elemental sulfur present during the polymerization being about 0.1–1.5 weight percent based on chloroprene.

7. A composition obtained by vulcanization of a composition of claim 1.

8. A composition obtained by vulcanization of a composition of claim 2.

9. A composition obtained by vulcanization of a compositiion of claim 4.

10. A method of improving the processing safety of vulcanizable chloroprene polymer stocks and reducing compression set of chloroprene polymer vulcanizates, said method comprising adding to an unvulcanized chloroprene polymer prepared in the absence of elemental sulfur about 0.5–5 parts by weight per 100 parts by weight of said polymer of a triarylphosphine, wherein the aryl groups are selected from phenyl, naphthyl, substituted phenyl, and substituted naphthyl;
    the substituents being one or more alkyl groups having up to a total of 10 carbon atoms per aromatic ring or one or more alkoxy groups having a total of up to five carbon atoms per aromatic ring;
    and the chloroprene polymer being selected from homopolymers of chloroprene and copolymers of chloroprene with at least one copolymerizable organic comonomer, wherein chloroprene constitutes at least 50 weight percent of the monomer makeup; said polymer stocks also comprising magnesia, zinc oxide, and a vulcanization accelerator.

11. The method of claim 10 wherein the chloroprene polymer prepared in the absence of elemental sulfur is modified with an alkyl mercaptan or a dialkyl xanthogen disulfide.

12. A method of improving the flex resistance of a chloroprene/sulfur copolymer, said method comprising adding to unvulcanized chloroprene/sulfur copolymer stock about 0.5–5 parts by weight of said copolymer of a triarylphosphine, wherein the aryl groups are selected from phenyl, naphthyl, substituted phenyl, and substituted naphthyl;
    the substituents being one or more alkyl groups having up to a total of ten carbon atoms per aromatic ring or one or more alkoxy groups having a total of up to five carbon atoms per aromatic ring;
    and the chloroprene/sulfur copolymer being selected from those polymers where chloroprene is the sole organic monomer and those where at least one other organic comonomer is present, chloroprene constituting at least 50 weight percent of the organic makeup; said polymer stock also comprising magnesia and zinc oxide.

13. The method of claim 12 wherein the chloroprene/sulfur copolymer is prepared in the presence of about 0.1–1.5 weight percent of sulfur based on the weight of total organic monomers.

14. The method of claim 12 wherein a vulcanization accelerator is present in the polymer stock.

* * * * *